(12) United States Patent
Watanabe et al.

(10) Patent No.: US 10,246,553 B2
(45) Date of Patent: Apr. 2, 2019

(54) ORGANIC FLUORINE COMPOUND AND LUBRICANT

(71) Applicant: SHOWA DENKO K.K., Tokyo (JP)

(72) Inventors: Kentaro Watanabe, Tokyo (JP); Yasuyuki Ueda, Tokyo (JP); Takeshi Igarashi, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 15/803,963

(22) Filed: Nov. 6, 2017

(65) Prior Publication Data

US 2018/0127543 A1  May 10, 2018

(30) Foreign Application Priority Data

Nov. 7, 2016  (JP) .................. 2016-217571

(51) Int. Cl.

| | | |
|---|---|---|
| *C08G 65/329* | (2006.01) | |
| *C08G 65/332* | (2006.01) | |
| *C08G 65/333* | (2006.01) | |
| *C08G 65/337* | (2006.01) | |
| *C10M 107/38* | (2006.01) | |

(52) U.S. Cl.
CPC ......... *C08G 65/329* (2013.01); *C08G 65/332* (2013.01); *C08G 65/337* (2013.01); *C08G 65/33317* (2013.01); *C08G 65/33375* (2013.01); *C10M 107/38* (2013.01); *C08G 2650/48* (2013.01); *C10M 2213/043* (2013.01); *C10M 2213/0606* (2013.01); *C10N 2230/56* (2013.01); *C10N 2240/204* (2013.01)

(58) Field of Classification Search
CPC ..................................... C08G 65/329
USPC ......................................... 546/170
See application file for complete search history.

(56) References Cited

U.S. PATENT DOCUMENTS

| | | | | |
|---|---|---|---|---|
| 5,055,359 A | | 10/1991 | Tsuno et al. | |
| 5,252,418 A | * | 10/1993 | Ishikawa ............ | G03G 5/14704 399/161 |
| 7,939,477 B2 | * | 5/2011 | Hashida ............... | C10M 169/00 508/182 |
| 2014/0029267 A1 | * | 1/2014 | Moon ....................... | F21V 3/06 362/311.03 |

FOREIGN PATENT DOCUMENTS

| | | |
|---|---|---|
| JP | S62-066417 | 3/1987 |
| JP | H09-282642 | 10/1997 |
| JP | 2008-075000 | 4/2008 |

* cited by examiner

*Primary Examiner* — Nizal S Chandrakumar
(74) *Attorney, Agent, or Firm* — IPUSA, PLLC

(57) ABSTRACT

In an organic fluorine compound, an organic group including a single aromatic ring or a condensed ring consisting of aromatic rings at a non-bonded terminal is bonded to each of all of terminals of a chain structure including a perfluoropolyether structure.

3 Claims, No Drawings

ORGANIC FLUORINE COMPOUND AND LUBRICANT

CROSS-REFERENCE TO RELATED APPLICATION

The present application is based on and claims the benefit of priority of Japanese Priority Application No. 2016-217571 filed on Nov. 7, 2016, the entire contents of which are hereby incorporated by reference.

BACKGROUND OF THE INVENTION

1. Field of the Invention

The present invention relates to an organic fluorine compound including a perfluoropolyether (PFPE) structure and a lubricant including the organic fluorine compound.

2. Description of the Related Art

As an organic fluorine compound including a perfluoropolyether structure has a large viscosity index in addition to having good heat resistance, chemical resistance and oxidation resistance, a small variation in fluidity (viscosity) over a wide temperature range from low temperature to high temperature, and demonstrates good lubricity. Further, the organic fluorine compound including a perfluoropolyether structure has properties such as being fireproof, not influencing a high-molecular material such as rubber or plastic, low vapor pressure, low evaporation loss, low surface tension and high electric insulation, and is known to demonstrate high performance over an extremely wide range as a lubricant. Thus, the organic fluorine compound including a perfluoropolyether structure is widely used as lubricating oil for various purposes such as vacuum pump oil, a lubricant for a magnetic disk/tape or the like, a heating medium or an incoherent agent.

As an example of using the organic fluorine compound including a perfluoropolyether structure as a lubricant, a disk-like substrate used as a magnetic recording medium may be exemplified. A magnetic recording medium is, in general, obtained by stacking a recording layer and the like on a substrate, thereafter, forming a protection layer of carbon or the like on the recording layer, and further forming a lubricant layer on the protection layer. The protection layer has a function to protect data recorded in the recording layer, and to increase sliding of a magnetic head that reads data.

However, durability of the magnetic recording medium cannot be sufficiently obtained only by providing the protection layer on the recording layer.

Thus, in general, a lubricant layer is formed by coating an organic fluorine compound including a perfluoropolyether structure on a surface of the protection layer as a lubricant. By providing the lubricant layer on the protection layer, durability is improved because a direct contact between the magnetic head and the protection layer can be prevented, and frictional force of a magnetic head that slides on the magnetic recording medium can be extremely reduced.

As a lubricant used for a magnetic recording medium, for example, an organic fluorine compound FOMBLIN Zdol (manufactured by Solvay Specialty Polymers) is known which is expressed by a chemical formula (2).

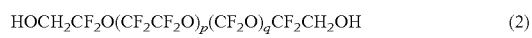

(Here, "p", "q" is an integer.)

Patent Document 1 discloses a magnetic recording medium in which the above described lubricant is coated.

Further, Patent Document 2 discloses a magnetic recording medium including a lubricant layer made of an organic fluorine compound FOMBLIN Ztetraol (manufactured by Solvay Specialty Polymers) expressed by a chemical formula (3).

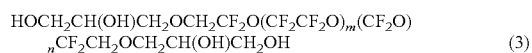

(Here, "m", "n" is an integer, and the number average molecular weight is 500 to 5000).

All of the organic fluorine compounds used for these lubricants have a feature that a hydroxy group is included at a terminal of a straight chain group including a perfluoropolyether structure.

Further, Patent Document 3 discloses a magnetic recording medium including a lubricant layer of an organic fluorine compound FOMBLIN AM2001 (manufactured by Solvay Specialty Polymers) expressed by a chemical formula (4).

[Chem. 1]

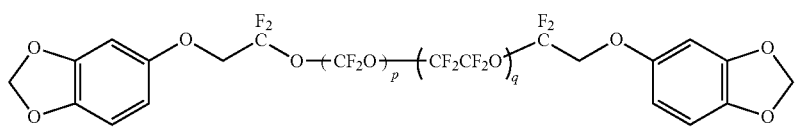

(4)

(Here, "p", "q" is an integer.)

Further, Patent Document 4 discloses a magnetic recording medium in which lubricant solution using an organic fluorine compound expressed by a chemical formula (5) as a lubricant is coated.

[Chem. 2]

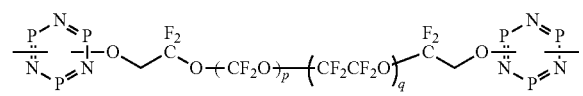

(5)

(Here, each of "p" and "q" is an integer greater than or equal to 1.)

All of the organic fluorine compounds used for these lubricants have a feature that an organic group with high polarity including a ring structure is included at a terminal of a straight chain group including a perfluoropolyether structure, and a ring that is not an aromatic ring is included in the ring structure.

In order to use an organic fluorine compound including a perfluoropolyether structure as a lubricant, after performing a process for enabling adsorption of a lubricant on a protection layer, on which a lubricant layer is to be formed, it is further necessary to provide a molecular structure to the organic fluorine compound for adsorbing on the protection layer.

In order to actualize adsorption of the lubricant, in general, a nitriding process is performed on the protection layer.

In the organic fluorine compound, which is a major constituent of the lubricant described in each of Patent Documents 1 and 2, as a hydroxy group at a terminal of the molecule can form a hydrogen bond with a nitrogen atom provided on the protection layer, adsorption of the lubricant on the protection layer is actualized.

On the other hand, not performing a nitriding process on a protection layer can be considered as usable to reduce a production cost, because it is possible to reduce the number of steps in manufacturing a magnetic recording medium. Further, when nitrogen atoms whose electronegativity is larger are added to the protection layer whose main constituents are carbon atoms and hydrogen atoms in general, polarity at a surface of the protection layer is increased. However, there is a merit, by not performing a nitriding process on the protection layer, that corrosion resistance is improved because such increasing of polarity can be suppressed.

However, there is a problem that, when trying to coat the above described lubricant on a protection layer on which a nitriding process is not performed, as hydrogen bonds are not formed between the protection layer and the lubricant, although a small amount of the lubricant is coated, a sufficient thickness cannot be obtained, and a magnetic recording medium cannot be actually used.

The protection layer is constituted by carbon atoms or diamond-like carbon (DLC) containing carbon atoms. It is known that a part of the carbon atoms in the DLC has an $sp^2$ hybrid orbital, and the DLC includes double bonds similar to bonds of carbon atoms in graphite.

Thus, it can be considered to actualize adsorption of a lubricant to a protection layer on which a nitriding process is not performed by a π-π interaction using these double bonds with adsorption sites in the lubricant.

In the organic fluorine compound, which is a major constituent of the lubricant described in each of Patent Documents 3 and 4, a ring structure with high polarity such as a 1,3-benzodioxolyl group and a phosphazene ring, respectively, is provided at a terminal. Thus, as these lubricants have high compatibility with a protection layer on which a nitriding process to provide polarity at a surface is provided, adsorption of the lubricant to the protection layer is actualized.

Meanwhile, as such a lubricant includes a ring structure including a conjugate structure in which single bonds and double bonds are alternately included, it can be considered, at a glance, that it is possible to adsorb the lubricant on the protection layer on which a nitriding process is not performed by a π-π interaction.

However, as such a ring structure is only constituted by a ring that is not an aromatic ring, or includes a ring that is not an aromatic ring, evenness of the ring structure is impaired. Thus, as a π-π interaction between such a lubricant and a protection layer on which a nitriding process is not performed is not sufficient, there is a problem that it is impossible to form a lubricant layer with a sufficient thickness.

PATENT DOCUMENTS

[Patent Document 1] Japanese Laid-open Patent Publication No. S62-66417

[Patent Document 2] Japanese Laid-open Patent Publication No. H9-282642

[Patent Document 3] U.S. Pat. No. 5,055,359

[Patent Document 4] Japanese Laid-open Patent Publication No. 2008-75000

SUMMARY OF THE INVENTION

The present invention is made in light of the above problems, and provides an organic fluorine compound capable of forming a lubricant layer with a sufficient thickness on a protection layer on which a nitriding process is not performed.

The present invention includes the following structures.

[1] An organic fluorine compound, including:
a chain structure including a perfluoropolyether structure, an organic group being bonded to each of all of terminals of the chain structure, the organic group including a single aromatic ring or a condensed ring consisting of aromatic rings at a non-bonded terminal.

[2] The organic fluorine compound according to clause [1], wherein the chain structure is a straight chain group.

[3] The organic fluorine compound according to clause [1] or [2], wherein the organic group is bonded to each of all of the terminals of the chain structure via an ether bond or a carboxylate ester bond whose carbonyl group being positioned at a side of the organic group.

[4] The organic fluorine compound according to any one of clauses [1] to [3], expressed by a general formula (1), where "A" is a group including the perfluoropolyether structure, each of "$R^1$" and "$R^2$" is, independently, the organic group including an aromatic ring or a polycyclic aromatic ring at a non-bonded terminal, "$E^1$" is an ether bond or a carboxylate ester bond whose carbonyl group being positioned at a side of "$R^1$", and "$E^2$" is an ether bond or a carboxylate ester bond whose carbonyl group being positioned at a side of "$R^2$".

[Chem. 3]

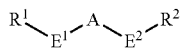
(1)

[5] The organic fluorine compound according to clause [4], wherein carbon number of each of "$R^1$" and "$R^2$" is, independently, less than or equal to 15.

[6] The organic fluorine compound according to clause [4] or [5], wherein "$R^1$" and "$R^2$" are the same.

[7] The organic fluorine compound according to any one of clauses [4] to [6], wherein "$E^1$" and "$E^2$" are the same.

[8] The organic fluorine compound according to any one of clauses [4] to [7], wherein the compound expressed by the general formula (1) is one of compounds expressed by the following chemical formulas (1-1) to (1-11), where each of "p" and "q" is a degree of polymerization.

[Chem. 4]

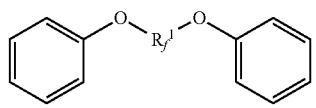
(1-1)

-continued

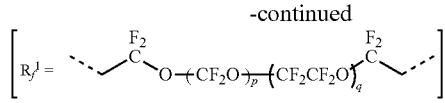
(1-2)

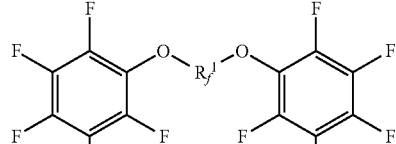
(1-3)

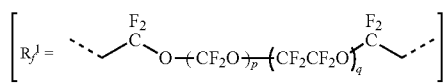

[Chem. 5]

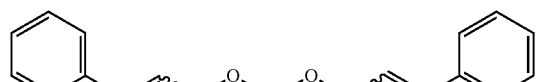
(1-4)

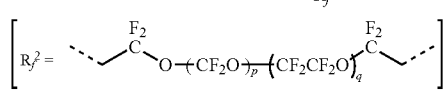

(1-5)

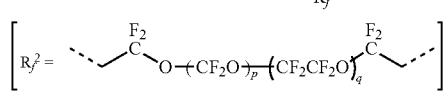

[Chem. 6]

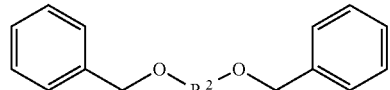
(1-7)

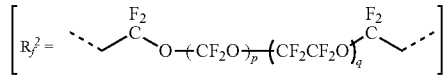

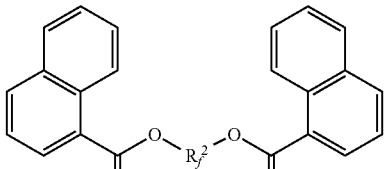
(1-8)

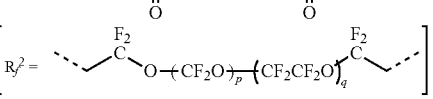

(1-9)

[Chem. 7]

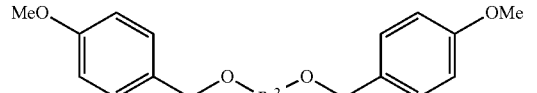
(1-10)

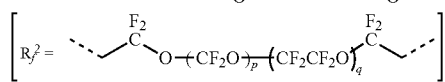

(1-11)

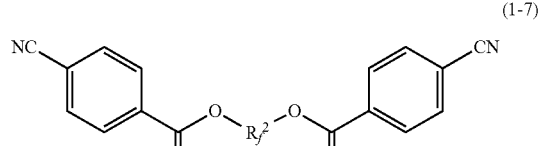

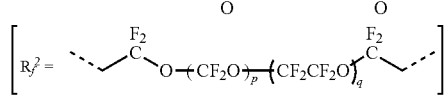

[9] The organic fluorine compound according to any one of clauses [1] to [8], wherein the chain structure includes at least one group expressed by a general formula (6), where "x" is an integer from 1 to 5.

$$—(CF_2)_xO— \quad (6)$$

[10] The organic fluorine compound according to clause [9], wherein the chain structure includes a group expressed by a general formula (7), where each of "y" and "z" is, independently, an integer from 1 to 50.

$$—(CF_2CF_2O)_y(CF_2O)_z— \quad (7)$$

[11] The organic fluorine compound according to any one of clauses [1] to [10], wherein the chain structure consists of the perfluoropolyether structure(s) and one or more methylene group(s).

[12] The organic fluorine compound according to any one of clauses [1] to [11], wherein the organic group consists of one or more unsubstituted aromatic ring(s) and/or one or more aromatic ring(s) each including an acyclic functional group whose number of atoms is less than or equal to 10.

[13] The organic fluorine compound according to clause [12], wherein the organic group is a condensed ring consisting of aromatic rings.

[14] The organic fluorine compound according to clause [12] or [13], wherein the organic group consists of one or more benzene ring(s) and/or pyridine ring(s).

[15] The organic fluorine compound according to any one of clauses [12] to [14], wherein the acyclic functional group is an electron-donating group.

[16] The organic fluorine compound according to any one of clauses [12] to [14], wherein the acyclic functional group includes a multiple bond directly bonding the aromatic ring.

[17] A lubricant including the organic fluorine compound according to any one of clauses [1] to [16].

DETAILED DESCRIPTION OF THE PREFERRED EMBODIMENTS (Organic Fluorine Compound)

An organic fluorine compound of the embodiment has a feature that an organic group including a single aromatic ring or a condensed ring consisting of aromatic rings at a non-bonded terminal is bonded to each of all of terminals of a chain structure including a perfluoropolyether structure. Here, the "non-bonded terminal" means one of terminals of the organic group that is not bonded to the chain structure.

As the organic fluorine compound of the embodiment includes a n conjugated system that spreads over the entire of the ring structure, it is possible to adsorb on a protection layer on which a nitriding process is not performed due to a sufficient n-n interaction between the protection layer, for example, diamond-like carbon (DLC), and as a result, it is possible to form a lubricant layer with a sufficient thickness on the protection layer.

In the organic fluorine compound of the embodiment, the chain structure including a perfluoropolyether structure is not particularly limited, and may be either of a straight chain group and a branched chain group. However, it is preferable to be a straight chain group. Further, although not particularly limited, it is preferable that the chain structure including a perfluoropolyether structure consists of one or more perfluoropolyether structure(s) and one or more methylene group(s). Further, it is preferable that all of the organic groups each including a single aromatic ring or a condensed ring consisting of aromatic rings at a non-bonded terminal are the same. As the organic fluorine compound having such a structure can be synthesized from materials that are industrially manufactured and easily available with a small number of steps, it is easy to be industrially used.

It is preferable that carbon number of the organic group including a single aromatic ring or a condensed ring consisting of aromatic rings at a non-bonded terminal is less than or equal to 15, and furthermore preferably, less than or equal to 10. With this, absorptivity of the organic fluorine compound to the protection layer on which a nitriding process is not performed can be increased.

It is preferable that the chain structure including a perfluoropolyether structure includes at least one group expressed by a general formula (6), where "x" is an integer from 1 to 5.

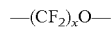
—(CF$_2$)$_x$O—  (6)

With this, solubility to a fluorine series solvent is increased, and as a result, it is possible to furthermore uniformly coat the organic fluorine compound on a surface to be coated. Further, among various perfluoropolyether structures, the perfluoropolyether structure where "x" is 1 to 3 is easy to be industrially used because it can be industrially manufactured and easily available.

Further, it is furthermore preferable that the chain structure including a perfluoropolyether structure includes a group expressed by a general formula (7), where each of "y" and "z" is, independently, an integer from 1 to 50.

—(CF$_2$CF$_2$O)$_y$(CF$_2$O)$_z$—  (7)

Further, it is preferable that mean formula mass of the group expressed by the general formula (7) is within a range of 800 to 6000, and more preferably, within a range of 1200 to 2400. With this, lubricity and solubility to a fluorine series solvent of the organic fluorine compound are improved.

Further, it is preferable that the chain structure including a perfluoropolyether structure and the organic group including a single aromatic ring or a condensed ring consisting of aromatic rings at a non-bonded terminal are bonded via an ether bond or a carboxylate ester bond whose carbonyl group being positioned at a side of the organic group. Further, it is preferable that all of the bonds between the chain structure and the organic groups are the same, and it is particularly preferable that the bonds are carboxylate ester bonds. It is possible for the organic fluorine compound having such a structure to reduce the number of synthesizing steps.

Although not particularly limited, it is preferable that the organic group including a single aromatic ring or a condensed ring consisting of aromatic rings at a non-bonded terminal consists of aromatic ring(s), and furthermore preferably, is a condensed ring consisting of aromatic rings. With this, absorptivity of the organic fluorine compound to the protection layer on which a nitriding process is not performed can be increased.

Although not particularly limited, it is preferable that the organic group including a single aromatic ring or a condensed ring consisting of aromatic rings at a non-bonded terminal consists of one or more benzene ring(s) and/or one or more pyridine ring(s), as the aromatic ring. With this, absorptivity of the organic fluorine compound to the protection layer on which a nitriding process is not performed can be increased.

As the organic group consisting of a single aromatic ring, for example, a phenyl group, an alkylphenyl group, a cyanophenyl group, an alkoxyphenyl group or the like may be exemplified.

As the condensed ring consisting of aromatic rings, in other words, as an organic group consisting of a polycyclic aromatic ring, for example, a naphthyl group, a quinolyl group or the like may be exemplified, and among them, an 1-naphthyl group is particularly preferable.

Further, the aromatic ring or the polycyclic aromatic ring that is positioned at the terminal of the organic group may include an acyclic functional group whose number of atoms is less than or equal to 10.

It is preferable that such an acyclic functional group is an electron-donating group. With this, electron density on the aromatic ring can be increased, and absorptivity of the organic fluorine compound to the protection layer on which a nitriding process is not performed can be furthermore increased.

As the organic group composed of an aromatic ring including an electron-donating group, for example, a 4-anisyl group or the like may be exemplified.

Further, it is preferable that the acyclic functional group includes a multiple bond directly bonding the aromatic ring even if it is other than the electron-donating group. By a π conjugated system expanded by such an acyclic functional group, absorptivity of the organic fluorine compound to the protection layer on which a nitriding process is not performed can be furthermore increased.

As the organic group composed of the aromatic ring including the acyclic functional group including a multiple bond directly bonding the aromatic ring, for example, a cinnamyl group, a 4-cyanophenyl group or the like may be exemplified.

It is preferable that the organic fluorine compound of the embodiment is a compound expressed by a general formula (1), where "A" is the group including a perfluoropolyether structure, each of "$R^1$" and "$R^2$" is, independently, the organic group including a single aromatic ring or a condensed ring consisting of aromatic rings at a non-bonded terminal, "$E^1$" is an ether bond or a carboxylate ester bond whose carbonyl group being positioned at a side "$R^1$", and "$E^2$" is an ether bond or a carboxylate ester bond whose carbonyl group being positioned at a side of "$R^2$".

[Chem. 8]

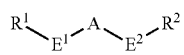

(1)

As a specific example of the compound expressed by the general formula (1), compounds expressed by the following chemical formulas (1-1) to (1-11) may be exemplified, where each of "p" and "q" is a degree of polymerization.

[Chem. 9]

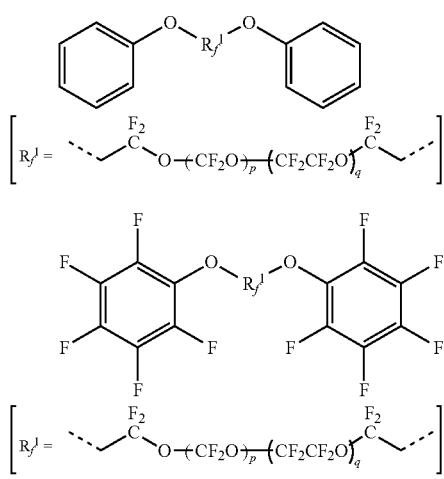

(1-1)

(1-2)

(1-3)

[Chem. 10]

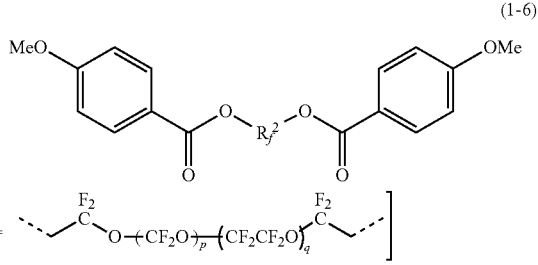

(1-4)

(1-5)

(1-6)

[Chem. 11]

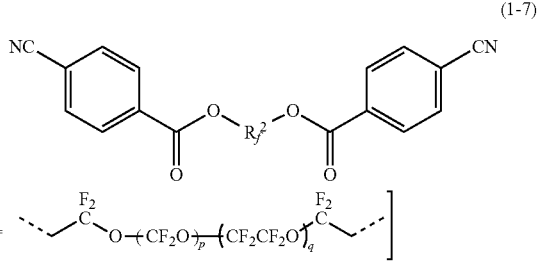

(1-7)

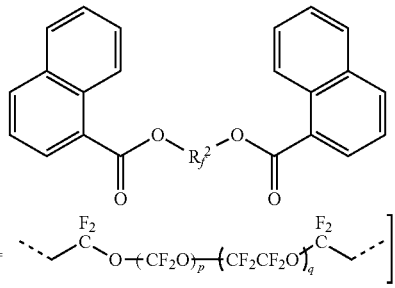

(1-8)

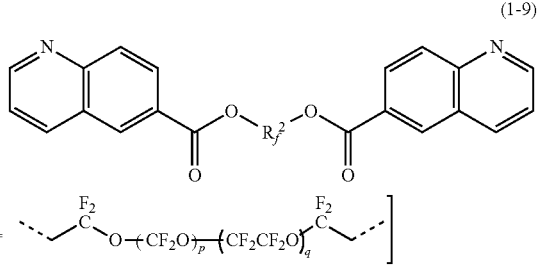

(1-9)

-continued

[Chem. 12]

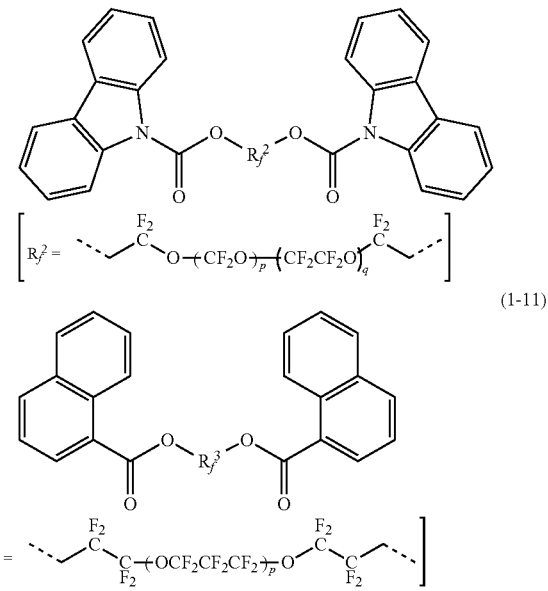

(1-10)

(1-11)

(Lubricant)

A lubricant of the embodiment includes the organic fluorine compound of the embodiment.

As the lubricant of the embodiment, the organic fluorine compound of the embodiment may be solely used, or another organic fluorine compound may be included in addition to the organic fluorine compound of the invention.

As the other organic fluorine compound, although not particularly limited, for example, an organic fluorine compound that is conventionally known as a lubricant may be used. As such a compound, for example, FOMBLIN (registered trademark) series (manufactured by Solvay Specialty Polymers) and the like may be exemplified.

Further, when the lubricant of the embodiment includes the organic fluorine compound of the embodiment and the other organic fluorine compound, it is preferable that the content of the organic fluorine compound of the embodiment in the lubricant is greater than or equal to 0.1 mass %, more preferably, greater than or equal to 1 mass %, and particularly preferably, greater than or equal to 10 mass %, in order to actualize better absorptivity to the protection layer on which a nitriding process is not performed.

(Method of Manufacturing Organic Fluorine Compound)

The organic fluorine compound of the embodiment may be manufactured in accordance with following three types of methods of synthesizing, for example.

(When all Bonds Between Chain Structure and Organic Groups are Ether Bonds)

Among the organic fluorine compounds of the embodiment, the organic fluorine compound of the embodiment, in which all bonds between the chain structure including a perfluoropolyether structure and the organic groups each including a single aromatic ring or a condensed ring consisting of aromatic rings at a non-bonded terminal are ether bonds, may be manufactured by a substitution reaction using a known perfluoropolyether compound including hydroxy groups at terminals as a starting material, for example.

In any methods, a base is applied to the perfluoropolyether compound to be deprotonated.

As the base, a generally known ionic base may be used, and for example, potassium carbonate, cesium carbonate, potassium tert-butoxide or the like may be exemplified.

The organic fluorine compound of the embodiment may be manufactured by reacting an alkyl halide including an aromatic ring or a polycyclic aromatic ring at a terminal with an alkoxide species generated by applying a base to a perfluoropolyether compound including a hydroxy groups at terminals, for example.

In any methods, after confirming a completion of the reaction by a method of a thin layer chromatography or the like, and neutralizing by adding dilute hydrochloric acid to the obtained mixture, a product may be extracted by a fluorine containing solvent such as hydrochlorofluorocarbon (AK-225, manufactured by Asahi Glass Co., Ltd, for example), and a crude product may be obtained by evaporating and removing the solvent by a rotary evaporator.

Further, the organic fluorine compound of the embodiment may be manufactured by performing a coupling reaction of the above described alkoxide species with aryl halide under an existence of a copper catalyst. This reaction may be performed by appropriately heating and stirring without using solvents.

Further, the organic fluorine compound of the embodiment may be manufactured as well by a nucleophilic aromatic substitution reaction in which the above described alkoxide species is used as an intermediate. This reaction may be performed by appropriately heating and stirring in a solvent.

As the solvent, it is preferable to use an aprotic polarity solvent, and it is particularly preferable to use N,N-dimethylacetamide.

In addition, the organic fluorine compound of the embodiment may be manufactured as well by a nucleophilic substitution reaction of the above described alkoxide species with an alkyl halide including an aromatic ring and including a halogen atom in a chain structure. This reaction may be performed by stirring without using solvents.

When an obtained product has a structure that is easily hydrolyzed due to the chain structure including a multiple bond in the organic group provided by the above described method, it is preferable that the multiple bond is converted to a single bond by a hydrogenation reaction under an existence of a palladium carbon catalyst to form a stable organic fluorine compound.

(When all Bonds Between Chain Structure and Organic Groups are Ester Bonds)

Among the organic fluorine compounds of the embodiment, the organic fluorine compound of the embodiment, in which all bonds between the chain structure including a perfluoropolyether structure and the organic groups each including a single aromatic ring or a condensed ring consisting of aromatic rings at a non-bonded terminal are ester bonds, may be manufactured by reacting a known perfluoropolyether compound including a hydroxy groups at terminals with an acid chloride under an existence of a base to be esterified, for example.

As the base, a generally known inorganic base and generally known organic base may be used, and for example, cesium carbonate, triethylamine, diisopropylamine or the like may be exemplified.

The above described reaction may be performed in a solvent.

As long as it is possible to dissolve a perfluoropolyether compound including hydroxy groups at both terminals, the solvent is not particularly limited, and for example, a chlorine containing solvent such as dichloromethane, a fluorine containing solvent such as hydrochlorofluorocarbon or the like may be exemplified.

It is preferable that the above reaction is conducted, after mixing starting materials at 0° C. using an ice bath and then removing the ice bath, while stirring at room temperature. By mixing the starting materials at 0° C., rapid heat generation can be suppressed, and generation of a by-product can be suppressed.

After adding dilute ammonia water to the reaction mixture obtained by the above reaction to hydrolyze and further deprotonate unreacted acid chloride leading to an aqueous layer, the obtained mixture may be extracted by a fluorine series solvent such as AK-225, and a crude product may be obtained by evaporating and removing the solvent by a rotary evaporator.

(When Ether Bond and Ester Bond are Mixed in Bonds Between Chain Structure and Organic Groups)

Among the organic fluorine compounds of the embodiment, the organic fluorine compound of the embodiment, in which an ether bond and an ester bond are mixed in bonds between the chain structure including a perfluoropolyether structure and the organic groups each including a single aromatic ring or a condensed ring consisting of aromatic rings at a non-bonded terminal, may be manufactured by a combination of the above described methods.

For example, the organic fluorine compound of the embodiment may be manufactured by, after performing a coupling reaction of the above described alkoxide species with aryl halide under an existence of a copper catalyst, reacting a remained unreacted hydroxy group with acid chloride under an existence of a base to be esterified.

(Purification)

The crude products obtained by each of the above described methods can be used as a lubricant. If higher purity is required, for example, the crude product may be purified by a silica gel column chromatography. If further higher purity is required, for example, the crude product may be purified by supercritical fluid extraction (SFE) with carbon dioxide. Specifically, the crude product is introduced in a pressure container, and by introducing liquefied carbon dioxide into the pressure container while keeping the pressure and the temperature in the container, the carbon dioxide is made into a supercritical fluid state and a targeted organic fluorine compound can be obtained by extraction.

It is preferable that the temperature in the pressure container is greater than or equal to 31° C. and less than or equal to 80° C. When the temperature is greater than or equal to 31° C., the carbon dioxide is made into a supercritical state, and when the temperature is less than or equal to 80° C., extraction property of the supercritical carbon dioxide becomes strong.

Further, it is preferable that the pressure in the pressure container is greater than or equal to 7.38 MPa and less than or equal to 30 MPa. When the pressure in the pressure container is greater than or equal to 7.38 MPa, the carbon dioxide is made into a supercritical state, and when the pressure in the pressure container is less than or equal to 30 MPa, pressure resistance property of the pressure container is not excessively required and price of the pressure container becomes low, and as a result, manufacturing cost becomes low.

(Usage of Lubricant)

The lubricant of the embodiment may be, for example, used as a lubricant for a magnetic recording medium (hard disk or the like).

As a method of coating the lubricant on a surface of the protection layer formed on a substrate for a magnetic recording medium, although not particularly limited, for example, spin coating, dipping or the like may be exemplified.

When coating the lubricant on the surface of the protection layer formed on the substrate by dipping, for example, after immersing the substrate on which the protection layer is formed in a lubricant solution provided in a dipping bath of a dip coat apparatus, the substrate on which the protection layer is formed is drawn up from the dipping bath at a predetermined speed. With this, a lubricant layer can be formed on the surface of the protection layer.

It is preferable that the content of the organic fluorine compound of the embodiment in the lubricant solution is greater than or equal to 0.005 mass %.

EXAMPLES

The present invention is specifically described based on examples in the following. However, the present invention is not limited to those examples.

($^1$H-NMR)

After dissolving a sample (approximately 10 mg to 30 mg) in a $CDCl_3$/hexafluorobenzene mixed solvent (approximately 0.5 mL), the sample was introduced in an NMR sample tube whose diameter was 5 mm and $^1$H-NMR was measured by the following conditions. At this time, a signal of tetramethylsilane added in the solvent was used as reference.

Apparatus: JNM-EX270 (manufactured by JEOL Ltd.)

Measured temperature: room temperature (Thickness of Lubricant Layer)

An infrared absorption spectrum was measured by the following conditions, and the thickness of the lubricant layer was obtained by intensity of an absorption peak corresponding to a stretching vibration energy of a C—F bond of the infrared absorption spectrum. At this time, four points were measured for each lubricant layer, and an average value was determined to be its thickness.

Apparatus: Nicolet iS50 (manufactured by Thermo Fisher Scientific Inc.)

Measurement method: reflection absorption spectroscopy

Example 1

Synthesis of Organic Fluorine Compound 1 (C1):

An organic fluorine compound FOMBLIN Zdol whose number average molecular weight (Mn) was approximately 2000 (manufactured by Solvay Specialty Polymers) (10 g, 5 mmol), copper (I) iodide (0.14 g, 0.75 mmol), 2-ethyl 2-oxocyclohexanecarboxylate (2.52 g, 1.5 mmol) and iodobenzene (1.6 g, 7.5 mmol) were mixed, and while stirring without adding a solvent, cesium carbonate (4.1 g, 13 mmol) was added. After stirring at 100° C. for 18 hours, the reaction mixture was separated by dilute hydrochloric acid (20 mL) and a fluorine series solvent AK225 (manufactured by Asahi Glass Co., Ltd) (20 mL), and an aqueous layer was extracted twice by AK225 (20 mL). After water washing the obtained organic layer, the obtained organic layer was dried by adding magnesium sulfate. After filtering and condensing it by a rotary evaporator, a crude product (9.4 g) was obtained as an orange brown oily material. By purified by a silica gel column chromatography (developing solvent:hexane-ethyl acetate ((9:1 to 3:1)), an organic fluorine compound (C1) including phenyl groups at both terminals was obtained as a colorless oily material (2.9 g, 1.4 mmol, yield 27%).

This colorless oily material was confirmed as the organic fluorine compound 1 (C1) by the following analysis result of NMR.

$^1$H-NMR δ (ppm): 4.32 (br, 4H), 6.92 (d, 4H), 7.04 (t, 2H), 7.31 (t, 4H).

[Chem. 13]

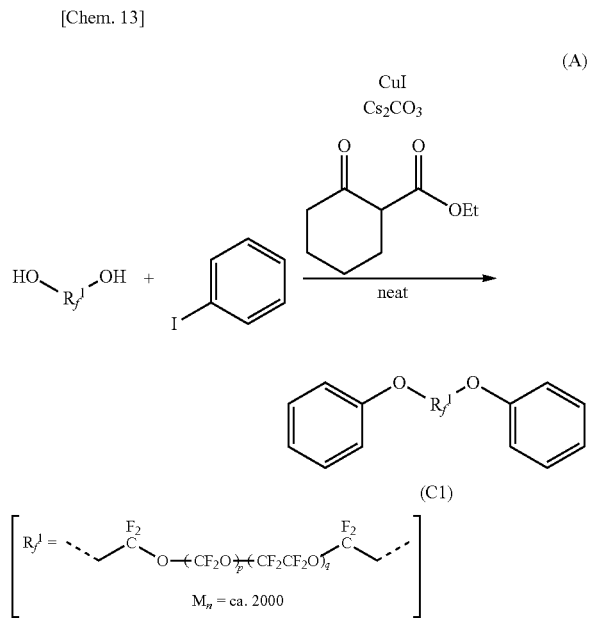

Example 2

Synthesis of Organic Fluorine Compound 2 (C2):

An organic fluorine compound FOMBLIN Zdol whose number average molecular weight (Mn) was approximately 2000 (3.0 g, 1.5 mmol) and hexafluorobenzene (2.5 g, 13 mmol) were added in N,N-dimethylacetamide (5 mL), and potassium carbonate (0.64 g, 4.5 mmol) was further added to the obtained mixture. After stirring at 80° C. for three days, the reaction mixture was separated by dilute hydrochloric acid (20 mL) and a fluorine series solvent AK225 (manufactured by Asahi Glass Co., Ltd)(20 mL), and an aqueous layer was extracted twice by AK225 (20 mL). After water washing the obtained organic layer, the obtained organic layer was dried by adding magnesium sulfate. After filtering and condensing it by a rotary evaporator, a crude product (3.1 g) was obtained as a lemon yellow oily material. By purified by a silica gel column chromatography (developing solvent:hexane-ethyl acetate (49:1)), an organic fluorine compound 2 (C2) including pentafluorophenyl groups at both terminals was obtained as a colorless oily material (2.0 g, 0.85 mmol, yield 57%).

This colorless oily material was confirmed as the organic fluorine compound 2 (C2) by the following analysis result of NMR.

$^1$H-NMR δ (ppm): 4.41 (br, 4H).

[Chem. 14]

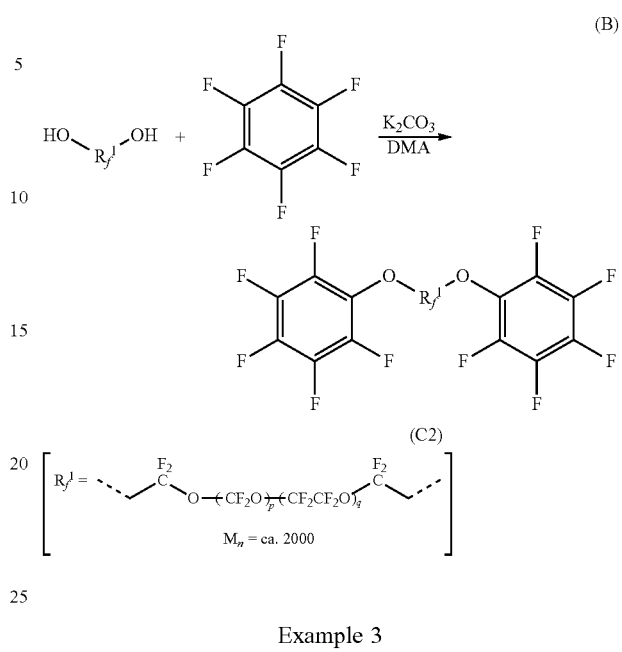

Example 3

Synthesis of Organic Fluorine Compound 3 (C3):

An organic fluorine compound FOMBLIN Zdol whose number average molecular weight (Mn) was approximately 1300 (manufactured by Solvay Specialty Polymers)(16 g, 12 mmol) and potassium tert-butoxide (1.4 g, 12 mmol) were mixed, and stirred at room temperature for four hours without adding a solvent. After adding cinnamyl bromide (2.4 g, 12 mmol) to the obtained mixture and further stirring at room temperature for 18 hours, the reaction mixture was separated by dilute hydrochloric acid (20 mL) and a fluorine series solvent AK225 (manufactured by Asahi Glass Co., Ltd)(20 mL), and an aqueous layer was extracted twice by AK225 (20 mL). After water washing the obtained organic layer, the obtained organic layer was dried by adding magnesium sulfate. After filtering and condensing it by a rotary evaporator, a crude product (17 g) was obtained as a yellow oily material. By purified by a silica gel column chromatography (developing solvent:hexane-ethyl acetate (9:1 to 17:3)), an organic fluorine compound (C3) including phenyl groups at both terminals was obtained as a colorless oily material (4.5 g, 2.9 mmol, yield 25%).

This colorless oily material was confirmed as the organic fluorine compound 3 (C3) by the following analysis result of NMR.

$^1$H-NMR δ (ppm): 3.79-3.88 (m, 4H), 4.30 (brd, 4H), 6.23 (ddt, 2H), 6.62 (d, 2H), 7.27-7.40 (m, 10H).

[Chem. 15]

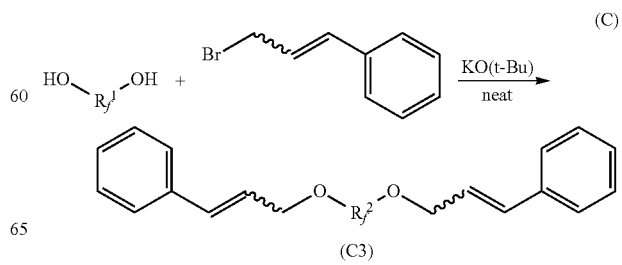

-continued

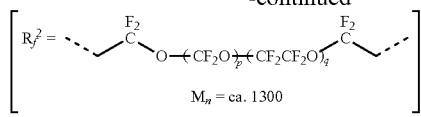

Here, cinnamyl bromide may be either of cis and trans.

Example 4

Synthesis of Organic Fluorine Compound 4 (C4):

The compound 3 obtained in the synthesis example 3 (1.3 g, 0.86 mmol) and a palladium carbon catalyst (0.10 g) were added in ethanol (20 mL), connected to a balloon made of a butyl rubber in which hydrogen gas (one atmosphere) is filled, and stirred at room temperature for 24 hours. After filtering and condensing the reaction mixture by a rotary evaporator, an organic fluorine compound 4 (C4) including phenyl groups at both terminals was obtained as a colorless oily material (1.2 g, 0.78 mmol, yield 90%).

This colorless oily material was confirmed as the organic fluorine compound 4 (C4) by the following analysis result of NMR.

$^1$H-NMR δ (ppm): 1.91 (tt, 4H), 2.69 (t, 4H), 3.58 (t, 4H), 3.77 (br, 4H), 6.23 (ddt, 2H), 7.15-7.20 (m, 6H), 7.27 (dt, 4H).

[Chem. 16]

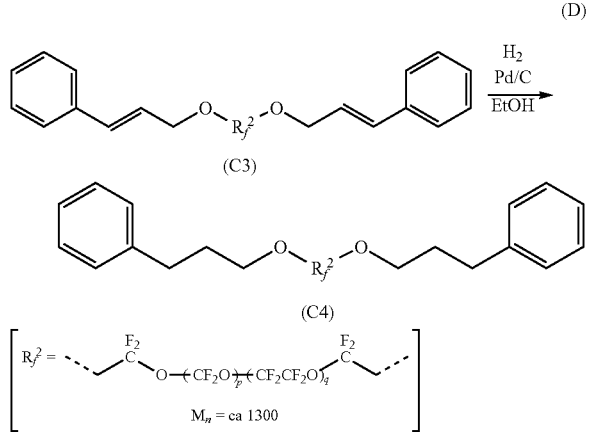

Example 5

Synthesis of Organic Fluorine Compound 5 (C5):

An organic fluorine compound FOMBLIN Zdol whose number average molecular weight (Mn) was approximately 1300 (manufactured by Solvay Specialty Polymers) (5.2 g, 4.0 mmol) and triethylamine (2.0 g, 20 mmol) were mixed in dichloromethane (40 mL), and benzoyl chloride (1.2 g, 8.8 mmol) was added while cooling by an ice bath. After removing the ice bath and stirring for three hours, the reaction mixture was water washed twice and dried by adding magnesium sulfate. After filtering and condensing it by a rotary evaporator, a crude product (6.0 g) was obtained as an opaque oily material. By purified by a silica gel column chromatography (developing solvent:hexane-ethyl acetate (17:3)), an organic fluorine compound (C5) including phenyl groups at both terminals was obtained as a colorless oily material (5.7 g, 3.8 mmol, yield 95%).

This colorless oily material was confirmed as the organic fluorine compound (C5) by the following analysis result of NMR.

$^1$H-NMR δ (ppm): 4.74 (br, 4H), 7.46 (dd, 4H), 7.62 (t, 2H), 8.00 (d, 4H).

[Chem. 17]

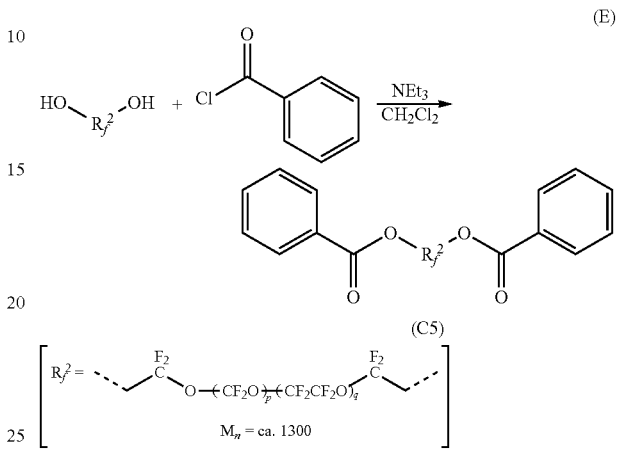

Example 6

Synthesis of Organic Fluorine Compound 6 (C6):

An organic fluorine compound FOMBLIN Zdol whose number average molecular weight (Mn) was approximately 1300 (manufactured by Solvay Specialty Polymers)(2.6 g, 2.0 mmol) and triethylamine (1.0 g, 10 mmol) were mixed in dichloromethane (20 mL), and 4-methoxybenzoyl chloride (0.76 g, 4.4 mmol) was added while cooling by an ice bath. After removing the ice bath and stirring for three hours, the reaction mixture was water washed twice and dried by adding magnesium sulfate. After filtering and condensing it by a rotary evaporator, a crude product (3.1 g) was obtained as an opaque oily material. By purified by a silica gel column chromatography (developing solvent:hexane-ethyl acetate (4:1)), an organic fluorine compound 6 (C6) including 4-methoxyphenyl groups at both terminals was obtained as a colorless oily material (2.7 g, 1.7 mmol, yield 87%).

This colorless oily material was confirmed as the organic fluorine compound (C6) by the following analysis result of NMR.

$^1$H-NMR δ (ppm): 3.87 (s, 6H), 4.65 (br, 4H), 6.94 (d, 4H), 8.01 (d, 4H).

[Chem. 18]

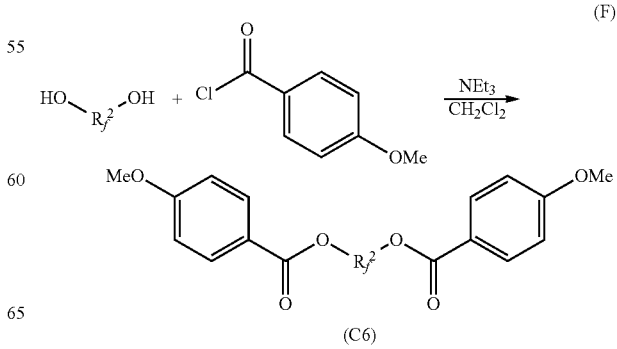

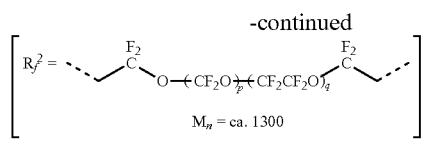

Example 7

Synthesis of Organic Fluorine Compound 7 (C7):

An organic fluorine compound FOMBLIN Zdol whose number average molecular weight (Mn) was approximately 1300 (manufactured by Solvay Specialty Polymers)(1.4 g, 1.1 mmol) and triethylamine (0.51 g, 4.5 mmol) were mixed in dichloromethane (20 mL), and 4-cyanobenzoyl chloride (0.54 g, 3.3 mmol) was added while cooling by an ice bath. After removing the ice bath and stirring for 18 hours, the reaction mixture was water washed twice and dried by adding magnesium sulfate. After filtering and condensing it by a rotary evaporator, a crude product (0.51 g) was obtained as an opaque oily material. By purified by a silica gel column chromatography (developing solvent:hexane-ethyl acetate (5:1)), an organic fluorine compound 7 (C7) including 4-cyanophenyl groups at both terminals was obtained as a colorless oily material (0.16 g, 0.10 mmol, yield 9%).

This colorless oily material was confirmed as the organic fluorine compound 7 (C7) by the following analysis result of NMR.

$^1$H-NMR δ (ppm): 4.72 (br, 4H), 7.77 (d, 2H), 8.16 (d, 2H).

[Chem. 19]

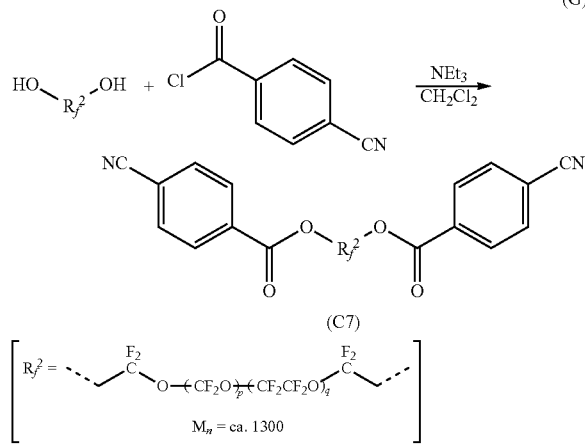

Example 8

Synthesis of Organic Fluorine Compound 8 (C8):

An organic fluorine compound FOMBLIN Zdol whose number average molecular weight (Mn) was approximately 1300 (manufactured by Solvay Specialty Polymers) (3.1 g, 2.4 mmol) and triethylamine (0.72 g, 7.1 mmol) were mixed in dichloromethane (40 mL), and 1-naphthoyl chloride (1.5 g, 7.9 mmol) was added while cooling by an ice bath. After removing the ice bath and stirring for three days, the reaction mixture was water washed twice and dried by adding magnesium sulfate. After filtering and condensing it by a rotary evaporator, a crude product (5.9 g) was obtained as an opaque oily material. By purified by a silica gel column chromatography (developing solvent:hexane-ethyl acetate (17:3)), an organic fluorine compound 8 (C8) including naphthyl groups at both terminals was obtained as a colorless oily material (3.3 g, 2.1 mmol, yield 89%).

This colorless oily material was confirmed as the organic fluorine compound 8 (C8) by the following analysis result of NMR.

$^1$H-NMR δ (ppm): 4.77 (br, 4H), 7.47-7.66 (m, 6H), 7.90 (d, 2H), 8.08 (d, 2H), 8.25 (dd, 2H), 8.92 (d, 2H).

[Chem. 20]

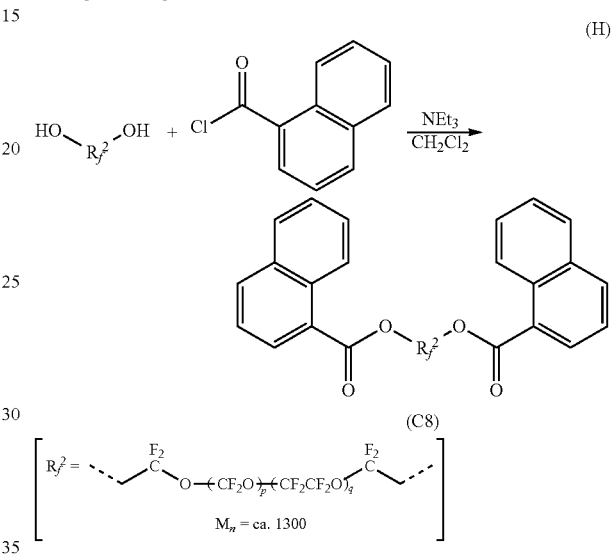

Example 9

Synthesis of Organic Fluorine Compound 9 (C9):

An organic fluorine compound FOMBLIN Zdol whose number average molecular weight (Mn) was approximately 1300 (manufactured by Solvay Specialty Polymers)(2.6 g, 2.0 mmol) and triethylamine (0.91 g, 9.0 mmol) were mixed in dichloromethane (10 mL), and 6-quinolinecarbonyl chloride (1.1 g, 6.0 mmol) was added while cooling by an ice bath. After removing the ice bath and stirring for 16 hours, the reaction mixture was separated by dilute ammonia water (20 mL) and a fluorine series solvent AK225 (manufactured by Asahi Glass Co., Ltd) (20 mL), and an aqueous layer was extracted twice by AK225 (20 mL). After water washing the obtained organic layer, the obtained organic layer was dried by adding magnesium sulfate. After filtering and condensing it by a rotary evaporator, a crude product (0.31 g) was obtained as an opaque oily material. By purified by a silica gel column chromatography (developing solvent:hexane-ethyl acetate (1:1)), an organic fluorine compound 9 (C9) including 6-quinolyl groups at both terminals was obtained as a colorless oily material (0.14 g, 85 μmol, yield 4%).

This colorless oily material was confirmed as the organic fluorine compound 9 (C9) by the following analysis result of NMR.

$^1$H-NMR δ (ppm): 4.76 (br, 4H), 7.43-7.53 (m, 2H), 8.18 (d, 2H), 8.26-8.32 (m, 4H), 8.62 (s, 2H), 9.03-9.05 (m, 2H).

[Chem. 21]

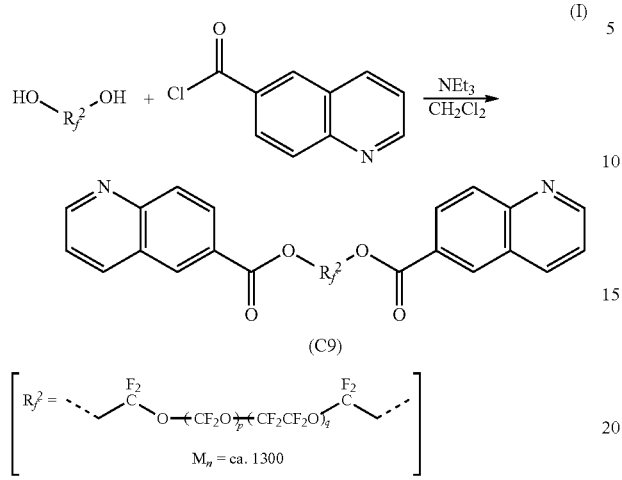

Example 10

Synthesis of Organic Fluorine Compound 10 (C10):

An organic fluorine compound FOMBLIN Zdol whose number average molecular weight (Mn) was approximately 1300 (manufactured by Solvay Specialty Polymers)(1.9 g, 1.5 mmol) and triethylamine (0.68 g, 6.5 mmol) were mixed in dichloromethane (10 mL), and carbazole-N-carbonyl chloride (1.0 g, 4.4 mmol) was added while cooling by an ice bath. After removing the ice bath and stirring for 16 hours, the reaction mixture was separated by dilute ammonia water (20 mL) and AK225 (20 mL), and an aqueous layer was further extracted twice by a fluorine series solvent AK225 (manufactured by Asahi Glass Co., Ltd)(20 mL). After water washing the obtained organic layer, the obtained organic layer was dried by adding magnesium sulfate. After filtering and condensing it by a rotary evaporator, a crude product (0.31 g) was obtained as an opaque oily material. By purified by a silica gel column chromatography (developing solvent: hexane-ethyl acetate (1:1)), an organic fluorine compound 10 (O10) including 9-carbazolyl groups at both terminals was obtained as a colorless oily material (88 mg, 52 µmol, yield 3%).

This colorless oily material was confirmed as the organic fluorine compound 10 (O10) by the following analysis result of NMR.

$^1$H-NMR δ (ppm): 4.87 (br, 4H), 7.36-7.49 (m, 8H), 7.97 (d, 4H), 8.24 (d, 4H).

[Chem. 22]

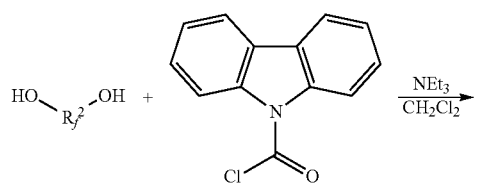

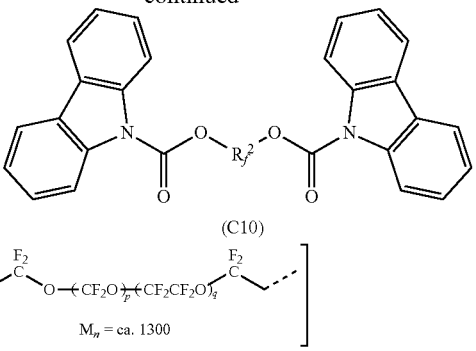

Example 11

Synthesis of Organic Fluorine Compound 11 (C11):

An organic fluorine compound DEMNUM whose number average molecular weight (Mn) was approximately 3400 (manufactured by DAIKIN INDUSTRIES, LTD.)(0.68 g, 0.20 mmol) and triethylamine (91 mg, 0.90 mmol) were mixed in dichloromethane (10 mL), and 1-naphthoyl chloride (0.12 g, 0.60 mmol) was added while cooling by an ice bath. After removing the ice bath and stirring for 16 hours, the reaction mixture was separated by dilute ammonia water (20 mL) and a fluorine series solvent AK225 (manufactured by Asahi Glass Co., Ltd)(20 mL), and an aqueous layer was extracted twice by AK225 (20 mL). After water washing the obtained organic layer, the obtained organic layer was dried by adding magnesium sulfate. After filtering and condensing it by a rotary evaporator, a crude product (0.71 g) was obtained as a colorless oily material. By purified by a silica gel column chromatography (developing solvent:hexane-ethyl acetate (17:3)), an organic fluorine compound 11 (C11) including naphthyl groups at both terminals was obtained as a colorless oily material (0.56 g, 0.15 mmol, yield 73%).

This colorless oily material was confirmed as the organic fluorine compound 11 (C11) by the following analysis result of NMR.

$^1$H-NMR δ (ppm): 4.82 (t, 4H), 7.47-7.55 (m, 4H), 7.58-7.64 (m, 2H), 7.90 (d, 2H), 8.08 (d, 2H), 8.26 (d, 2H), 8.92 (d, 2H).

[Chem. 23]

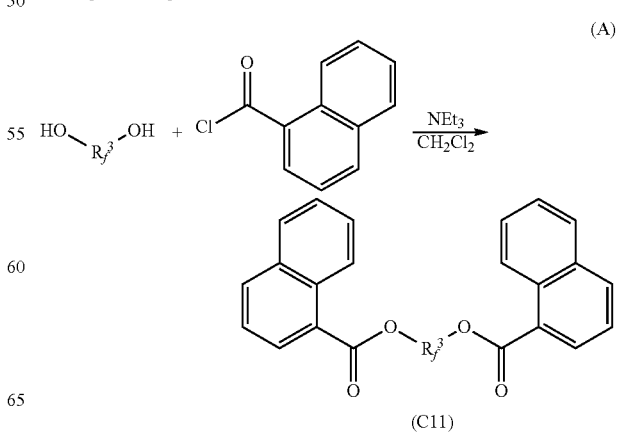

-continued

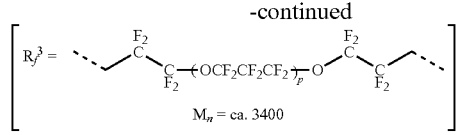

Comparative Example 1

As the organic fluorine compound, an organic fluorine compound FOMBLIN Zdol whose number average molecular weight (Mn) was approximately 2000 (see chemical formula (2)) was prepared.

Comparative Example 2

As the organic fluorine compound, an organic fluorine compound FOMBLIN Ztetraol whose number average molecular weight (Mn) was approximately 2000 (manufactured by Solvay Specialty Polymers)(see chemical formula (3)) was prepared.

Comparative Example 3

An organic fluorine compound FOMBLIN AM2001 whose number average molecular weight (Mn) was approximately 2000 (manufactured by Solvay Specialty Polymers) (see chemical formula (4)) was prepared.
(Magnetic Disk 1)

After forming a recording layer of 100 Å by depositing a CrTi alloy by DC magnetron sputtering on a 2.5-inch glass substrate for a magnetic disk, a protection layer of 30 Å was formed on the recording layer by depositing CVD carbon by decomposing ethylene gas by RF plasma while applying bias to the substrate to form a simulation disk.

Next, as the lubricant, the organic fluorine compound 1 of the example 1 was dissolved in tetradecafluorohexane PF-5060 (manufactured by 3M) and a lubricant solution of 0.01 mass % was prepared.

Next, the lubricant solution was coated on the protection layer of the simulation disk by dipping according to the following method. Specifically, the simulation disk was immersed in the lubricant solution provided in a dipping bath of a dip coat apparatus, and the simulation disk was drawn up from the dipping bath to coat the lubricant solution on the protection film of the simulation disk. Thereafter, by drying the simulation disk on which the lubricant solution was coated, the lubricant layer was formed and a magnetic disk 1 was manufactured.
(Magnetic Disks 2 to 10)

Magnetic disks 2 to 10 were manufactured similarly as the magnetic disk 1 except that the organic fluorine compounds 2 and 4 to 11 of the examples 2 and 4 to 11 were respectively used instead of the organic fluorine compound 1 of the example 1.
(Magnetic Disk 11)

A magnetic disk 11 was manufactured similarly as the magnetic disk 1 except that the organic fluorine compound of the comparative example 1 was used instead of the organic fluorine compound 1 of the example 1.
(Magnetic Disk 12)

A magnetic disk 12 was tried to be manufactured similarly as the magnetic disk 1 except that the organic fluorine compound of the comparative example 2 was used instead of the organic fluorine compound 1 of the example 1. However, as the organic fluorine compound of the comparative example 2 was not dissolved in tetradecafluorohexane, a lubricant layer could not be formed.
(Magnetic Disk 13)

A magnetic disk 13 was manufactured similarly as the magnetic disk 1 except that the organic fluorine compound of the comparative example 2 was used instead of the organic fluorine compound 1 of the example 1, and Vertrel XF (manufactured by Du Pont-Mitsui Fluorochemicals Co., Ltd.) was used instead of tetradecafluorohexane.
(Magnetic Disk 14)

A magnetic disk 14 was manufactured similarly as the magnetic disk 1 except that the organic fluorine compound of the comparative example 3 was used instead of the organic fluorine compound 1 of the example 1.

The thickness of the lubricant layer of the magnetic disk is illustrated in Table 1.

TABLE 1

| MAGNETIC DISK | ORGANIC FLUORINE COMPOUND | THICKNESS (nm) |
| --- | --- | --- |
| 1 | EXAMPLE 1 | 0.9 |
| 2 | EXAMPLE 2 | 0.8 |
| 3 | EXAMPLE 4 | 0.9 |
| 4 | EXAMPLE 5 | 1.0 |
| 5 | EXAMPLE 6 | 1.2 |
| 6 | EXAMPLE 7 | 1.2 |
| 7 | EXAMPLE 8 | 1.3 |
| 8 | EXAMPLE 9 | 1.5 |
| 9 | EXAMPLE 10 | 1.5 |
| 10 | EXAMPLE 11 | 1.4 |
| 11 | COMPARATIVE EXAMPLE 1 | 0.3 |
| 13 | COMPARATIVE EXAMPLE 2 | 0.2 |
| 14 | COMPARATIVE EXAMPLE 3 | 0.3 |

As illustrated in Table 1, it can be understood that, for each of the magnetic disks 1 to 10 manufactured by using the organic fluorine compounds 1, 2 and 4 to 11 of the examples 1, 2 and 4 to 11, respectively, the lubricant layer with a sufficient thickness was formed on the protection layer on which a nitriding process was not performed. With this, for each of the magnetic disks 1 to 10, the lubricant layer covers the entirety and sufficient lubricity and corrosion-resistance can be provided.

On the other hand, for each of the magnetic disks 11, 13 and 14 manufactured by using the organic fluorine compounds of the comparative examples 1 to 3, respectively, each not including a single aromatic ring or a condensed ring consisting of aromatic rings at both terminals, a lubricant layer with a sufficient thickness was not formed on the protection layer on which a nitriding process was not performed.

The organic fluorine compound of the comparative example 3 is the same as the organic fluorine compounds 1, 2 and 4 to 11 of the examples 1, 2 and 4 to 11, respectively, at a point of including aromatic rings at both terminals. However, as the organic fluorine compound of the comparative example 3 further includes a ring that is not an aromatic ring at the both terminals, evenness of adsorption sites is impaired. Thus, it can be confirmed that the lubricant layer with a sufficient thickness could not be formed in the magnetic disk 14. This result shows a favorable aspect of a molecular structure in which a ring structure at each of both terminals is constituted by only aromatic rings.

As the aromatic ring (benzene ring) positioned at each of the both terminals of the organic fluorine compound 5 of the example 5 is substituted by the acyclic functional group in each of the organic fluorine compounds 6 and 7 of the examples 6 and 7, respectively, the thickness of the lubricant layer of each of the magnetic disks 5 and 6 is larger than that of the magnetic disk 4.

Further, as each of the organic fluorine compounds 8 to 11 of the examples 8 to 11, respectively, includes condensed ring consisting of aromatic rings at each of the both terminals, the thickness of the lubricant layer of each of the magnetic disks 7 to 10 is larger than that of each of the magnetic disks 1 to 6.

According to an embodiment of the present invention, an organic fluorine compound capable of forming a lubricant layer with a sufficient thickness on a protection layer on which a nitriding process is not performed can be provided.

INDUSTRIAL APPLICABILITY

The organic fluorine compound of the embodiment can be adsorbed on a substrate including a protection layer including a carbon atom without performing a nitriding process, and a lubricant layer with a sufficient thickness can be formed.

What is claimed is:

1. An organic fluorine compound comprising one organic fluorine compound selected from the group of compounds represented by the following chemical formulas (1-5) to (1-11),

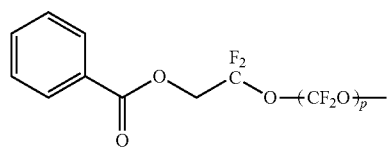
(1-5)

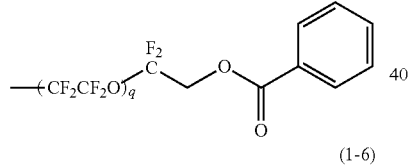

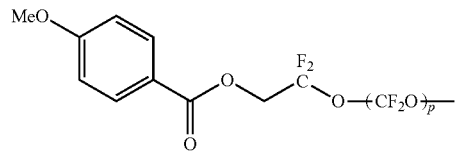
(1-6)

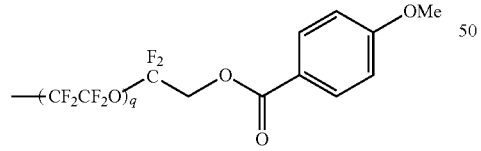

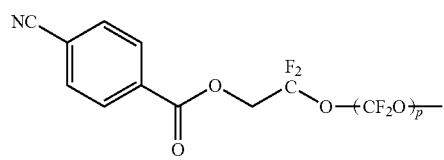
(1-7)

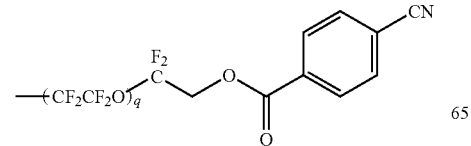

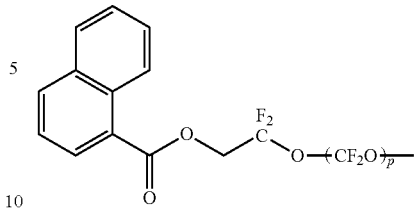
(1-8)

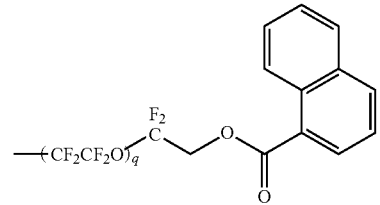

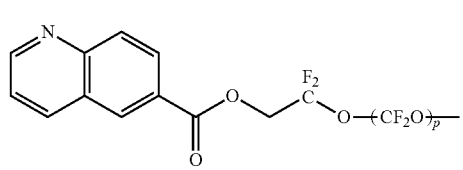
(1-9)

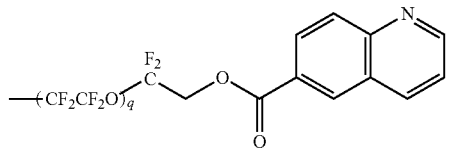

(1-10)

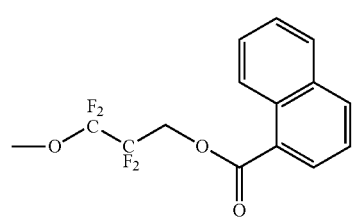
(1-11)

where each of "p" and "q" is a degree of polymerization.

2. The organic fluorine compound according to claim 1, wherein each of "p" and "q" is, independently, an integer from 1 to 50.

3. A lubricant comprising:
the organic fluorine compound according to claim 1.

* * * * *